Feb. 19, 1957 S. KAUFMAN 2,781,970

ANALOG COMPUTER

Filed Oct. 8, 1951

Inventor: Sidney Kaufman

By: [signature]

His Attorney 2,781,970

ANALOG COMPUTER

Sidney Kaufman, Houston, Tex., assignor to Shell Development Company, Emeryville, Calif., a corporation of Delaware Application October 8, 1951, Serial No. 250,299

3 Claims. (Cl. 235—61)

This invention relates to electronic computer machines of the analog type, and pertains more particularly to a computer especially adapted to perform mathematical operations required in solving complex geophysical problems such, for example, as those of the distribution or downward projection of potential fields, gravity fields, etc., it being, however, understood that the principle of operation of the present computer is in no way limited in its application to geophysics, but may on the contrary be applied to substantially any desired larger class of mathematical operations, as will be apparent from the description hereinbelow.

Electronic computer machines may be broadly divided into two classes: the digital computers and the analog computers. The digital computers, while giving substantially absolute accuracy, have the drawback of requiring an extremely large amount of electronic equipment when applied to the solution of complex problems. The analog computers, on the other hand, while capable of operating on considerably less equipment, have an accuracy which may sometimes be short of that desired for a particular problem.

It is therefore an object of this invention to provide a computer machine, which, although operating basically along the lines of analog computers, is adopted to apply, at a certain stage of the operations, a digital mode of calculation, thereby greatly increasing the accuracy of the final results.

It is also an object of this invention to provide an analog computer of the type wherein desired field values are inserted into the apparatus as voltages, which may be accurate, for example, to three digits or better, and the desired mathematical operation, such for example as multiplication, division, etc. is thereupon performed by the apparatus.

It is also an object of this invention to provide an analog computer wherein the answer is read out by means of a voltage comparator which requires only inappreciable power for its performance. It is also an object of this invention to provide an analog computer wherein the answer is given in terms of a time interval between two pulses. The principle of indicating voltages in terms of precisely measurable time intervals insures that the power used in indicating or reading out the desired values does not upset the voltage relations. This permits the accuracy of the final answer to remain as high as the accuracy of the inserted field values or data, and makes the operation of the computer relatively independent of circuit or voltage variations. It also permits the reading out procedure to be performed at a rapid rate.

It is also an object of this invention to provide an analog computer comprising an automatic switching system capable of selecting each voltage and its appropriate factor for presentation to a voltage comparator, the switching rate being arbitrarily adjustable at any desired figure, such as 2, 4, 8 or more per second.

It is also an object of this invention to provide an analog computer wherein a complete change of field values, corresponding, for example, to an identical computation performed at a different point of the area of interest, is obtained by reinserting a multicontact plug element into a different set of jacks arranged on a board, the position of each jack corresponding to a grid point of the area over which the original field data were obtained.

These and other objects of this invention will be understood from the following description taken with reference to the appended drawings, wherein.

Figures 1, 2, 3, 4:
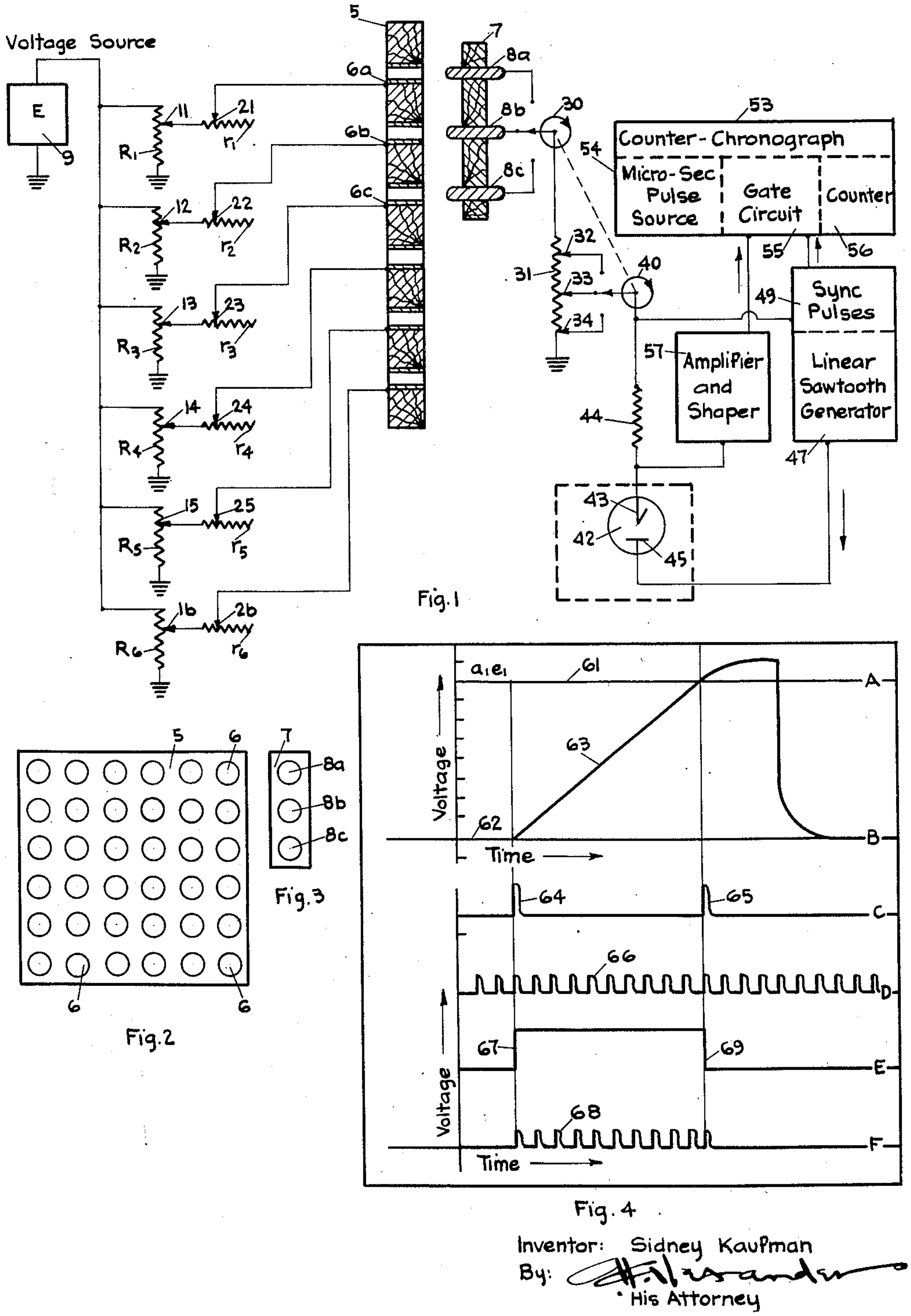
Fig. 1 is a schematic diagram of the present system.
Figs. 2 and 3 are face elevation views of the jackboard and plugboard shown in cross-section in Fig. 1.
Fig. 4 shows voltage curves illustrating the operation of the present device.

Before describing the present apparatus, a brief analysis of a typical problem of the kind said apparatus is adapted to solve will be presented.

Assume that we have a set of grid values $F_1$, $F_2$, $F_3$, . . . $F_n$ obtained from measurements, or from a contour map based on measurements, such for example as gravity measurements, magnetic gradient measurement, soil gas analysis measurements, etc. Assume also that we are given a set of coefficients $V_1$, $V_2$, $V_3$, . . . $V_k$, where $k<n$, which coefficients it is desired to apply in a predetermined manner to said grid values. Specifically, it is desired to evaluate in succession the following sums wherein the subscript $i$ assumes, successively, all integral values between one and $k$:

$$V_1F_1+V_2F_{1,2}+V_3F_{1,3}+ \dots +V_kF_{1,k} \qquad (1a)$$

$$V_1F_2+V_2F_{2,2}+V_3F_{2,3}+ \dots +V_kF_{2,k} \qquad (1b)$$

$$V_1F_3+V_2F_{3,2}+V_3F_{3,3}+ \dots +V_kF_{3,k} \qquad (1c)$$

etc., etc.

Each term in the above sums consists of a product of two factors. The first factor is one of the constants $V_i$; the second factor is the grid value at a point selected in accordance with the needs of the desired computation. In particular, the grid values $F_{1,2}$, $F_{1,3}$, $F_{1,4}$, etc., are the values at points in the neighborhood of the point whose grid value is $F_1$; the grid values $F_{2,2}$, $F_{2,3}$, $F_{2,4}$, etc., are the values at points in the neighborhood of the point whose grid value is $F_2$, etc. Furthermore, the relative locations of the points with grid values $F_{1,2}$ and $F_1$ are the same as the relative locations of the points with grid values $F_{2,2}$ and $F_2$; likewise for the relative locations of the points with grid values $F_{1,3}$ and $F_1$ and the points with grid values $F_{2,3}$ and $F_2$, etc.

Let $V_m$ be the largest value of the set of coefficients $V_i$ (where $i$ is any integer less than or equal to $k$) and define $a_i=V_i/V_m$; also let $F_m$ be equal to or greater than the maximum grid value. The sums shown under (1) can then be rewritten as follows:

$$F_mV_m\left(a_1\frac{F_1}{F_m}+a_2\frac{F_{1,2}}{F_m}+ \dots +a_k\frac{F_{1,k}}{F_m}\right) \qquad (2a)$$

$$F_mV_m\left(a_1\frac{F_2}{F_m}+a_2\frac{F_{2,2}}{F_m}+ \dots +a_k\frac{F_{2,k}}{F_m}\right) \qquad (2b)$$

$$F_mV_m\left(a_1\frac{F_3}{F_m}+a_2\frac{F_{3,2}}{F_m}+ \dots +a_k\frac{F_{3,k}}{F_m}\right) \qquad (2c)$$

etc., etc.

It is now possible to set up the desired analog. Thus, if any particular grid value be designated $F_i$, let the ratio of two voltages $e_i/E$, where E is an arbitrary fixed voltage, be the analog of the ratio $F_i/F_m$. The voltage analog of the sums expressed under (2) will then be:

$$\frac{F_mV_m}{E}(a_1e_1+a_2e_{1,2}+ \dots +a_ke_{1,k}) \qquad (3a)$$

$$\frac{F_mV_m}{E}(a_1e_2+a_2e_{2,2}+ \dots +a_ke_{2,k}) \qquad (3b)$$

$$\frac{F_mV_m}{E}(a_1e_3+a_2e_{3,2}+ \dots +a_ke_{3,k}) \qquad (3c)$$

etc., etc.

It is obviously possible to divide the voltage E accurately in such a manner as to obtain each $e_i$ value at individual jacks of the jackboard. A multicontact plug is properly inserted, and a set of voltages is available for sampling.

By moving the multicontact plug to an adjacent position, a second set of voltages is obtained and made available for the same type of sampling.

It is evident that by successively changing the position of the multicontact plug, it is possible to obtain successively the voltages required for Expressions 3*a*, 3*b*, 3*c*, etc.; only one of these expressions, 3*a*; will therefore be considered hereinbelow.

The operation of the system will be understood by reference to the drawings of which Fig. 2 diagrammatically shows a terminal jackboard or panel 5 accommodating a plurality of insulated electrical outlets or jacks 6. The number of these jacks differs with the type of problems to which the apparatus is to be normally applied, and may vary from, for example, 36 jacks as diagrammatically shown in Fig. 2, to a thousand or more jacks. The jacks 6 are arranged on the terminal board 5 in the same geometrical array as, for example, the grid points on a gravity or magnetic field map, the values of said grid points having been determined by actual measurements. The movable multicontact plug board or panel 7, shown in Fig. 3, has arranged thereon, a plurality of plugs 8, of which only three (8*a*, 8*b*, 8*c*) are shown in Fig. 3, but of which any suitable number, such as 3, 10, 20 or more may be arranged in any desired pattern on the board 7. The boards 5 and 7, which are shown in plan view in Figs. 2 and 3, and in side elevation cross-section in Fig. 1, may be made of any non-conducting material, such as wood, fiber, plastic, etc.

A suitable constant source of potential 9 supplies the desired voltages to the circuits of Fig. 1. If E is the value of the arbitrary fixed potential of the source 9, it is possible to obtain therefrom, at individual jacks 6 of the board 5, the desired individual values $e_i$ of the Equations 3*a*, 3*b* and 3*c* hereinabove. This is done by means of voltage dividers or series resistances $R_1$ to $R_6$ and associated fine control series resistors $r_1$ to $r_6$ whose values are adjusted, by means of sliding contacts 11 to 16 and 21 to 26, so that the voltages appearing at the jackboard 5 satisfy the expression $e_i=(F_i/F_m)E$ when the board 7 is plugged into the board 5 and the plugs 8 are consecutively contacted by a stepping or sweeping switch 30, which may be a hand or automatically operated switch of any desired type, such as rotary, electronic, etc. The switch 30 is loaded by a precision resistor 31, having taps 32, 33 and 34, preferably of an accuracy approaching one part in 100,000. The taps 32, 33 and 34 are swept by a second switch 40, similar to switch 30 and mechanically linked or ganged thereto. The position of each tap is so adjusted that the proportion of the voltage across precision resistor 31 which is applied to the switch 40 has a value numerically equal to one of the $a_i$ factors of the Equations (3) hereinabove.

Thus, with a proper wiring of the two ganged switches 30 and 40, the voltages appearing at 40 for the successive positions of the arms of said switches may be made to equal, in succession, $a_1e_1$, $a_2e_2$, $a_3e_3$, etc.

These voltages are fed to a voltage comparator circuit diagrammatically shown as comprising essentially a comparator diode 42, having a cathode 43 loaded by a resistor 44, through which the diode 42 is connected to switch 40, and an anode 45 connected to the output of a linear sawtooth generator circuit 47 adapted to produce a voltage form rising substantially linearly with time, the linearity being preferably better than 0.1 percent during the voltage rise time. A source of synchronizing or sync pulses 49, which is suitably connected to the ganged switches 30 and 40 as shown in Fig. 1, supplies start pulses to the sawtooth generator 47 and to a digital type counter chronograph unit 53, which may comprise, for example, a source of extremely high-frequency pulses, such as micro-second pulses 54, a gate circuit 55 and a counter 56. Stop pulses are supplied to the counter-chronograph 53 from the output of an amplifier and shaper circuit 57, whose input is connected to the cathode of the diode comparator 42. Energizing power for all elements and units from 30 to 57 is supplied from any desired source, and suitable connections which are not shown in order to avoid complicating the diagram of Fig. 1.

The operation of the present system may be briefly outlined as follows:

At a moment when the plug board 7 is plugged into the jackboard 5, the switch 30 is contacting plug 8*a* and switch 40 is contacting the tap 32, a voltage $a_1e_1$ is applied to the cathode 43 of the comparator tube, said voltage being shown as a constant positive voltage 61 on line A in Fig. 4.

After a short delay 62 desirable to allow the voltages to become stabilized, a sync pulse 64 shown on line C is delivered by the source circuit 49 to the sawtooth generator circuit 47. This starts a substantially linear rise of the voltage applied to the anode 45 of the diode 42, as shown at 63, said anode voltage having until then been negative with regard to the cathode.

At the instant when the linearly rising anode sawtooth voltage 63 becomes equal to the positive cathode voltage 61 (or, more accurately, exceeds said voltage 61 by a predetermined very small value), the diode 42 becomes conductive, and the current flow through the resistor 44 results in a signal. This signal, or at least the beginning thereof, is amplified and shaped by the unit 57 to give it as steep a front as possible, the resulting pulse 65 being transmitted to the counter-chronograph 53. It will be seen that the time interval between the initiating sync pulse 64 and the final output pulse 65 is a rectilinear function of the magnitude of voltage 61, this voltage being thus expressed in terms of time. It may be noted that the actual shape of the sawtooth voltage 63, after it has exceeded the voltage 61, is of no importance for the purposes of this invention.

When the switch 30 or 40, or both of them, move to the next contact or contacts, for example 8*b* and 33, the same sequence of operations is repeated, with the difference that the time interval between the initiating sync pulse and the output pulse is now a linear function of a voltage $a_2e_2$, of which the component $e_2$ is due to the setting of variable resistors $R_2$ and $r_2$ and the component $a_2$ is due to the position of tap 33 on resistor 31. The process may then be repeated, manually or automatically for any desired number of successive switchings, each switching giving rise to a pair of pulses whose separation in time is a linear function of the voltage applied to the cathode of tube 42.

The counter-chronograph 53 is preferably a microsecond counter capable of indicating the total elapsed time between a pair of pulses with an accuracy of $\pm 1$ microsecond, and of totalizing the indicated time counts due to the succession of consecutive pairs of pulses, so that its final reading, using the symbols of the equations hereinabove, is statistically equal to $\Sigma a_ie_i$. Counter-chronograph units are well known in the art and are commercially available. They will therefore not be described here, it being sufficient to say, referring to the curves of Fig. 4, that the pulses 66 from the microsecond pulse source 54 are admitted to the counter 56 by the gate circuit 55 only during the time between the start and output pulses 64 and 65 when the voltage of the gate circuit has some value such as illustrated on line E between moments 67 and 69. The counter 56 thus counts only the microsecond pulses 68 shown in line F during the time interval between said moments 67 and 69.

The count for zero input voltage to the comparator cannot be zero because of circuit considerations, but this initial count, which may be designated $p_0$, is a constant of the system and is easily determined. Thus, if $P_a$ is the observed count in microseconds corresponding to $\Sigma a_i e_i$ and if it is desired to obtain a result only proportional to the sum expressed in Equation 3*a* hereinabove, then the desired value is given by $(P_a - kp_0)$. If, however, it is desired to express the final result in the same units as the field values, $F_i$, it becomes necessary to determine another readily obtainable constant of the system, namely, the count corresponding to the voltage E. If this count is denoted by $p_m$, the sum given by Equation 3*a* can be written as $$\frac{F_m V_m}{p_m}(P_a - kp_0)$$

with $p_m$, $p_0$ and $P_a$ expressed in microseconds.

If the sum given by Equation 3*a* consists of both positive and negative terms then, with the proper number of nulls inserted to make the number of positive operations equal the number of negative operations, and with a proper arrangement of counter-chronographs so that the answer $P_a$ is the algebraic sum of the positive and negative terms, it is evident that the above expression is reduced to the form $$\frac{F_m V_m}{p_m} P_a$$

I claim as my invention:

1. An electronic computer, comprising a constant source of potential, a fixed support member, a plurality of electrical outlets mounted thereon, a voltage divider network interconnecting said source and said outlets in such a manner that the potential appearing at each outlet bears a predetermined ratio to the potential at each other outlet, a movable support member, a plurality of plugs mounted thereon, said plugs being adapted for simultaneous connection with said outlets, a plurality of contacts each connected to one of said plugs, a movable switch mounted to sweep over said contacts, a plurality of second contacts, a voltage divider network interconnecting said movable switch and said second contacts in such a manner that the potential appearing at each of said second contacts bears a predetermined ratio to the potential at each other second contact, a second switch mounted to sweep over said second contacts, said second switch being mechanically ganged with said first switch, a sawtooth generator of periodical linearly rising voltages, a thermionic voltage comparator having its cathode connected to the second switch and its anode connected to said sawtooth generator, said comparator becoming conductive when the voltage applied to its anode by said generator becomes more positive than that applied to its cathode by said second switch, a counter circuit comprising a source of high frequency pulses, and means connecting said counter circuit to said voltage comparator and to said sawtooth generator, whereby said counter circuit operates to count the high frequency pulses occurring between a signal transmitted thereto from the sawtooth generator upon the start of a periodically rising voltage and a signal transmitted thereto from said thermionic voltage comparator upon said comparator becoming conductive.

2. An electronic computer, comprising a constant source of potential, a fixed support member, a plurality of electrical outlets mounted thereon, a voltage divider network interconnecting said source and said outlets in such a manner that the potential appearing at each outlet bears a predetermined ratio to the potential at each other outlet, a movable support member, a plurality of plugs mounted thereon, said plugs being adapted for simultaneous connection with said outlets, a plurality of contacts each connected to one of said plugs, a movable switch mounted to sweep over said contacts, a plurality of second contacts, a voltage divider network interconnecting said movable switch and said second contacts in such a manner that the potential appearing at each of said second contacts bears a predetermined ratio to the potential at each other second contact, a second switch mounted to sweep over said second contacts, said second switch being mechanically gauged with said first switch, a sawtooth generator of periodical linearly rising voltages, a thermionic voltage comparator having its cathode connected to the second switch and its anode connected to said sawtooth generator, said comparator becoming conductive when the voltage applied to its anode by said generator becomes more positive than that applied to its cathode by said second switch, a counter circuit comprising a source of high frequency pulses, a shaping amplifier having its input connected to said voltage comparator and its output connected to said counter circuit, and a source of synchronizing pulses connected to deliver its output to said sawtooth generator and to said counter circuit, whereby said counter circuit operates to count the high frequency pulses occurring between a signal transmitted to said counter circuit by said source of synchronizing pulses upon the start of a periodically rising voltage and a signal transmitted to said counter circuit by said shaping amplifier upon said thermionic voltage comparator becoming conductive.

3. An electronic computer comprising first electrical contact means for simultaneously displaying a plurality of constant potentials bearing a predetermined fixed ratio to each other, second contact means registering with said first contact means for simultaneously sampling a plurality of said potentials, the number of said second contact means being less than the number of said first contact means, a circuit comprising a rotatable switch cyclically sweeping over said second contact means for consecutively modifying each of the sampled potentials by a predetermined different factor, said potential modification being effected by applying the sampled potentials to a voltage divider network in said circuit, means comprising a second rotatable switch for cyclically and consecutively sampling said modified potentials, said second switch being mechanically ganged with said first switch, a sawtooth voltage generator for producing a periodic linearly rising voltage, a thermionic voltage comparator having its cathode connected to the second rotatable switch and its anode connected to the output of said sawtooth generator for consecutively comparing each of said modified potentials with said periodic linearly rising voltage, a source of high-frequency pulses, and a counter having its input connected to said source and to said voltage comparator for counting the number of high frequency pulses produced during the time period required for the linear voltage applied to the anode of said voltage comparator to exceed the value of the sampled potential applied to the cathode thereof.

References Cited in the file of this patent

UNITED STATES PATENTS

| | | |
|---|---|---|
| 2,156,061 | Muller | Apr. 25, 1939 |
| 2,313,666 | Peterson | Mar. 9, 1943 |
| 2,468,150 | Wilcox | Apr. 26, 1949 |
| 2,477,395 | Sunstein | July 26, 1949 |
| 2,567,532 | Stephenson | Sept. 11, 1951 |
| 2,601,403 | Lacy | June 24, 1952 |
| 2,616,965 | Hoeppner | Nov. 4, 1952 |

FOREIGN PATENTS

| | | |
|---|---|---|
| 166,686 | Austria | Sept. 11, 1950 |